June 12, 1934.  W. J. HUNTER, SR  1,962,597
REAR VISION MIRROR FOR MOTOR CARS
Filed Nov. 28, 1931
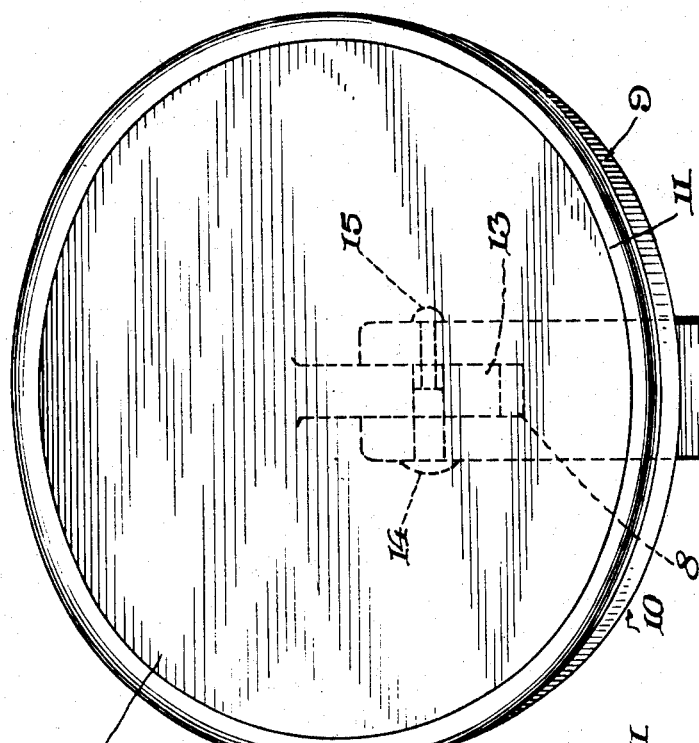
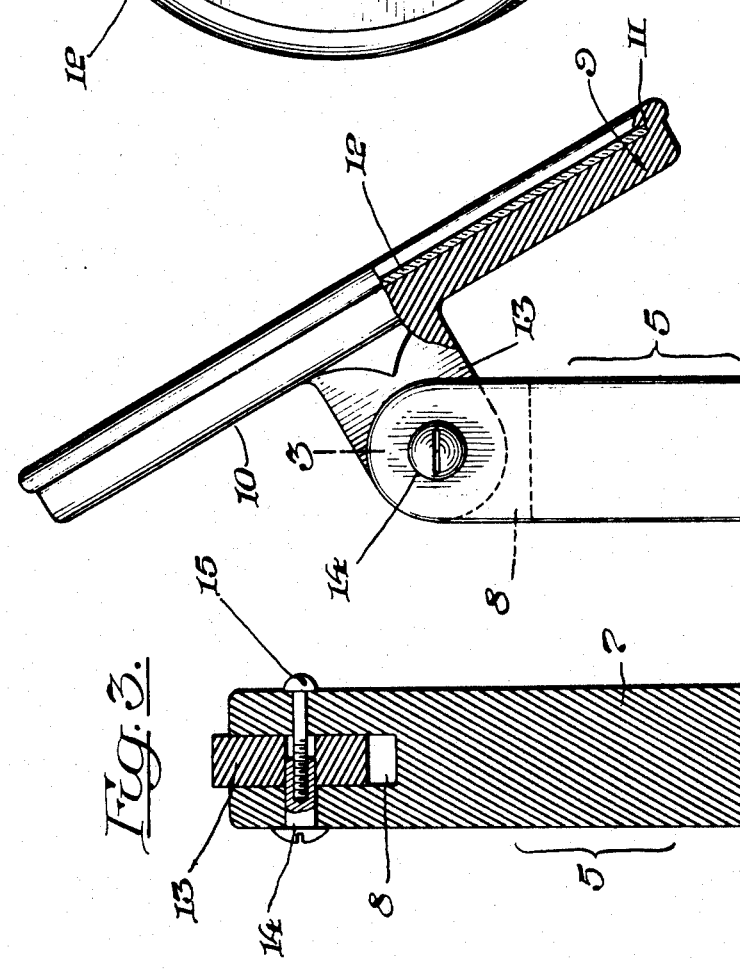
Inventor
William J. Hunter, Sr.
by his Attorneys
John R. Nolan Patented June 12, 1934

1,962,597

UNITED STATES PATENT OFFICE 1,962,597

REAR VISION MIRROR FOR MOTOR CARS

William J. Hunter, Sr., New York, N. Y.

Application November 28, 1931, Serial No. 577,735

6 Claims. (Cl. 45—97)

This invention relates to rear vision mirrors for motor cars, and particularly to the type of mirror which is mounted on a fixture supported laterally of the car, as, for example, on one of the front fenders.

An object of my invention is to provide a simple and efficient construction whereby the mirror and its fixture are effectually protected from breakage when subjected to excessive shocks or jars.

Another object of my invention is to provide an inherently resilient mirror back to which the mirror proper can be readily applied.

Another object is to provide an inherently resilient back and mounting therefor, whereby the back and the associated mirror can be readily adjusted to and fixed in any desired angular position.

With these and other objects in view my invention comprises novel features of construction and arrangement which will be hereinafter described and claimed.

In the drawing—

Figure 1 is a side elevation, partly in section, of a rear vision mirror and fixture embodying the preferred form of my invention.

Fig. 2 is a front elevation of the device.

Fig. 3 is a transverse vertical section, as on the line 3—3 of Fig. 1.

Referring to the drawing, 5 designates a bracket comprising a substantial base 6 and a standard 7 having a slotted or bifurcated upper end 8, the whole being an integral structure of elastic material, preferably molded india rubber. The base is bolted or otherwise secured to a fender or other suitable support located on one side of a motor car. The standard by virtue of its elasticity yields to excessive shocks and jars without breakage and then resumes its normal position.

9 designates a mirror back comprising a protective body 10 of elastic material, preferably molded resilient rubber, formed with an undercut peripheral flange 11 constituting a ring which can be readily sprung around the edge of a mirror 12 in a manner to receive and securely support the latter. The flange, as well as the body, serves as a cushion to protect the mirror from breakage, but should the mirror be accidentally broken it can be readily replaced by another.

The elastic mirror back 9 has formed on its rearward face a centrally-disposed integral flat lug 13 which is pivotally mounted in the bifurcated upper end of the standard 7 so that the back can be bodily adjusted to various angles as need may require. The lug 13 centrally reinforces the back and supports it in close contact with the mirror, which lug being resilient permits maximum lateral movement of the back and mirror independently of the standard when the back is struck at any point within its circumference or when it impinges against an obstruction, thus acting as a cushion which not only tends to protect the device from breakage but also insures its return to normal position. Since the base and standard are made of resilient material as previously mentioned, they also contribute to the protection of the mirror.

In the present instance one of the members of the bifurcated upper end of the standard 7 supports a cylindrical plug 14 which is fitted in the countersunk end of a transverse perforation in the lug 13 of the mirror back, and the other member supports a screw 15 which extends through the perforation of the lug and is threaded in the plug. Owing to the elasticity of the lug and the embracing supporting members, the associated parts can be readily clamped together by properly manipulating the screw 15, thus effectually securing the mirror back at any desired position of angular adjustment with respect to the standard.

I claim—

1. A rear vision device comprising a mirror, a resilient standard and a mirror supporting back of elastic material pivotally mounted on said standard, and having an integral peripheral flange sprung on the edge of the mirror.

2. A rear vision mirror comprising an integral base and standard of elastic material, the upper end of said standard being bifurcated, and a mirror back of elastic material having an integral rearwardly projecting lug pivotally supported in the bifurcated end of the standard.

3. A rear vision mirror comprising a body of elastic material constructed to receive and support a mirror and having a rearwardly disposed integral lug, a support of elastic material having a bifurcated portion to receive the lug, and a pivot for said lug constructed and arranged to clamp the elastic lug and bifurcated portion together.

4. A rear vision device comprising a mirror, a resilient standard, and a back of elastic material supporting the entire rear area of the mirror, said back having an integral peripheral flange sprung on the edge of the mirror, and having also a resilient rearwardly projecting connection between the central portion of said elastic back and the standard, which connection cen- 5. A rear vision device comprising a mirror, a mirror supporting back of elastic material supporting the entire rear area of the mirror, said back having a rearwardly projecting resilient lug centrally supporting the back in contact with the mirror and also having a peripheral flange sprung on the edge of the mirror, a support, and means for pivotally mounting the lug in said support.

6. A rear vision device comprising a mirror, a mirror supporting back of elastic material supporting the entire rear area of the mirror, said back having an undercut peripheral groove sprung on the edge of the mirror and having also a rearwardly projecting integral elastic lug centrally supporting the back in contact with the mirror, a support, and means for pivotally mounting the elastic lug on said support.

WILLIAM J. HUNTER, Sr.